Sept. 1, 1970          R. L. PALEN          3,526,414
LANDING GEAR ASSEMBLY
Filed Feb. 19, 1969          4 Sheets-Sheet 1
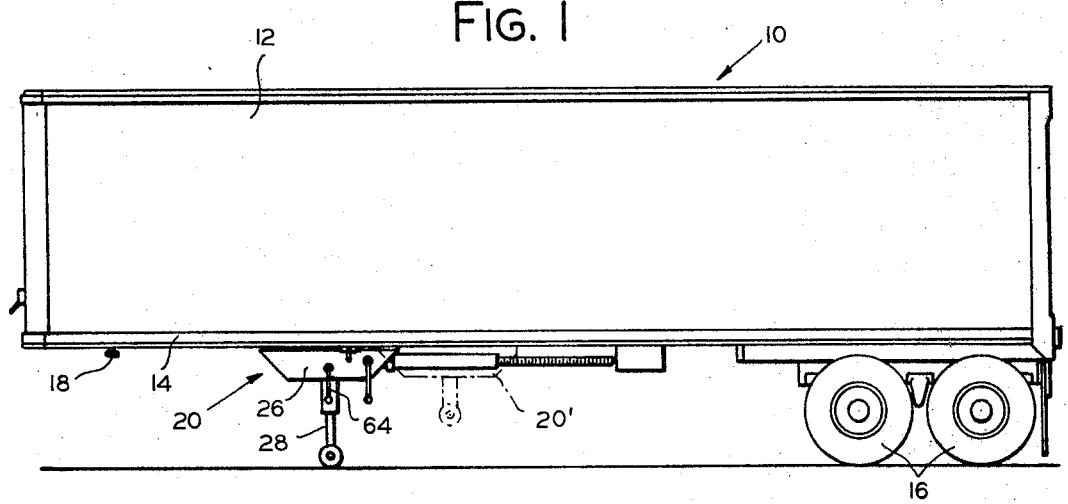
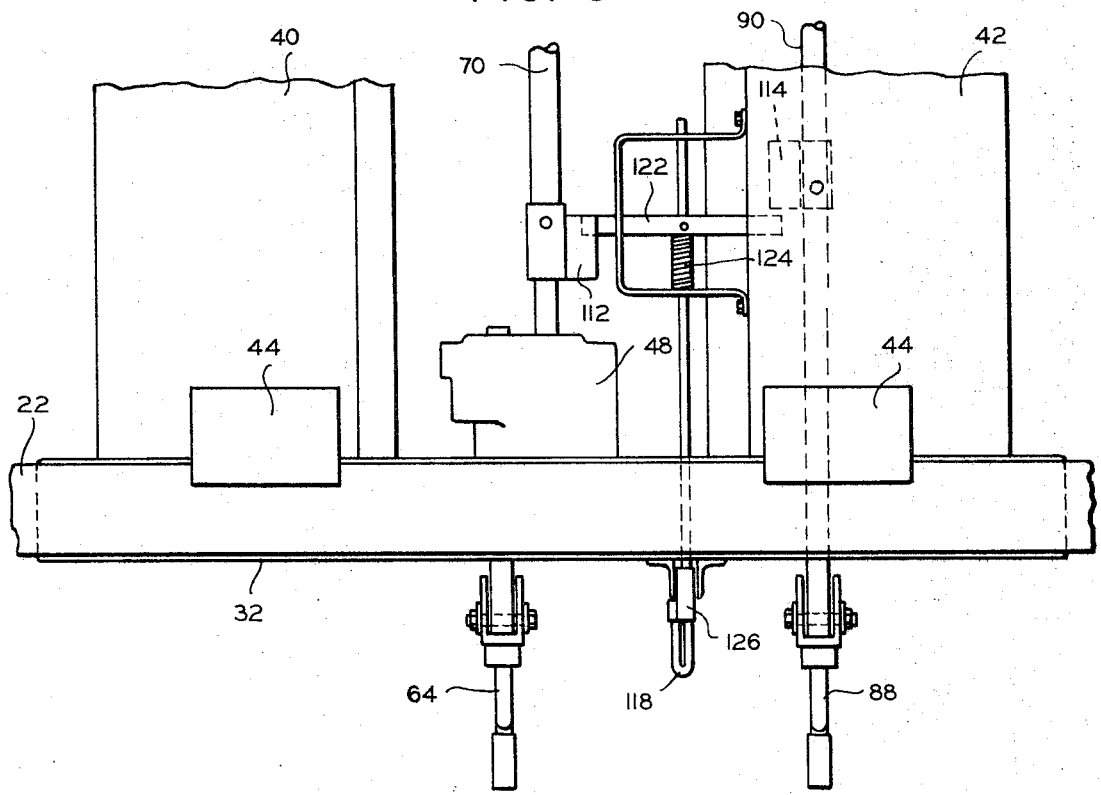
INVENTOR
RICHARD L. PALEN
BY *Robert H Johnson*
ATTORNEY

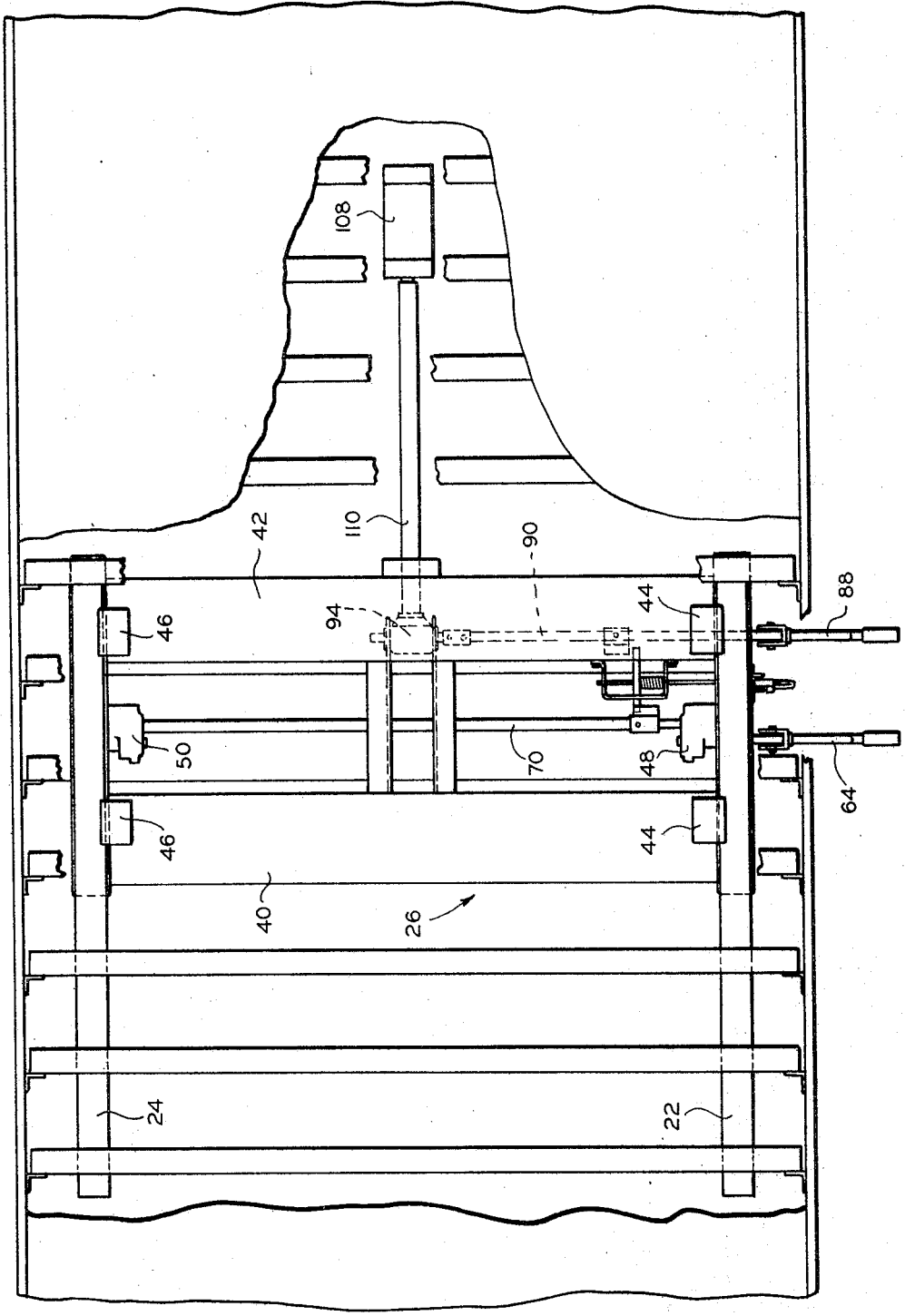

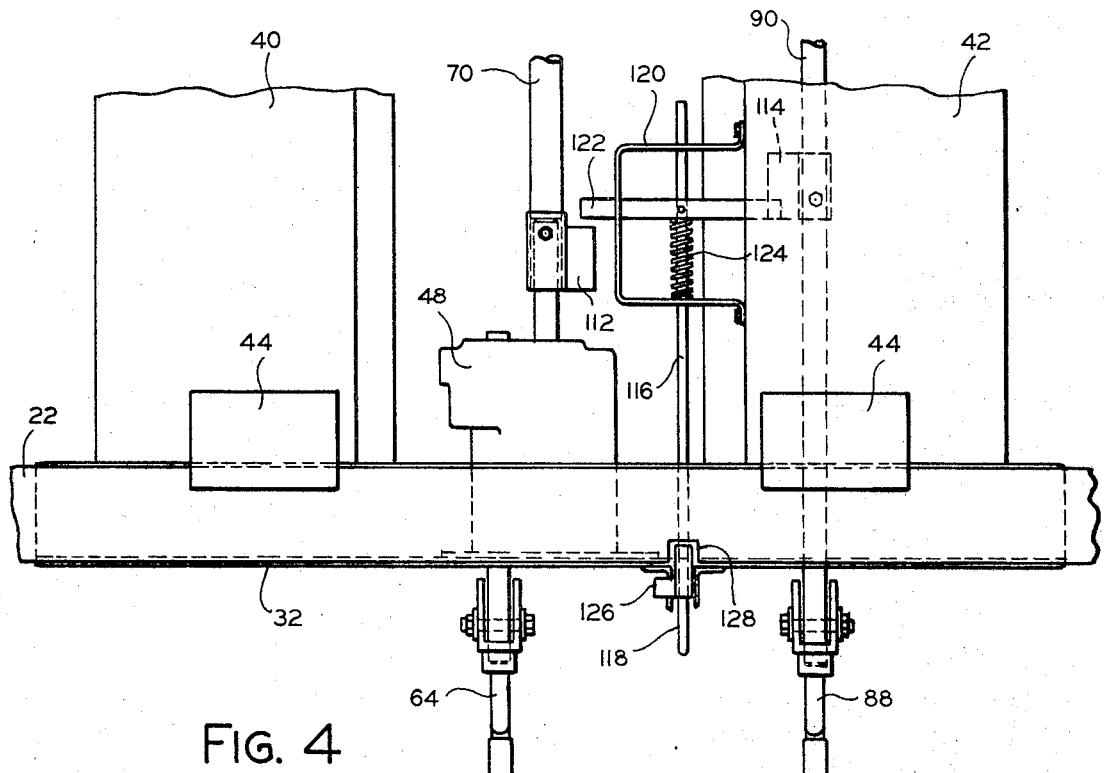
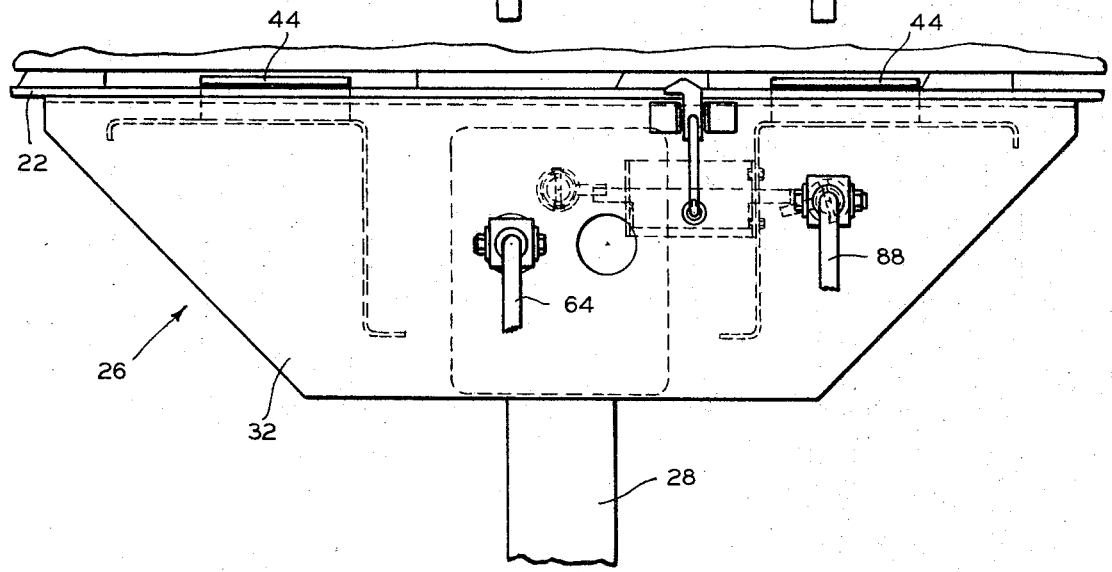

Sept. 1, 1970 R. L. PALEN 3,526,414
LANDING GEAR ASSEMBLY
Filed Feb. 19, 1969 4 Sheets-Sheet 4

INVENTOR
RICHARD L. PALEN
BY Robert H. Johnson
ATTORNEY

United States Patent Office 3,526,414
Patented Sept. 1, 1970

3,526,414
LANDING GEAR ASSEMBLY
Richard L. Palen, New Buffalo, Mich., assignor to Clark
Equipment Company, a corporation of Delaware
Filed Feb. 19, 1969, Ser. No. 800,435
Int. Cl. B60s 9/04
U.S. Cl. 280—150.5                         4 Claims

ABSTRACT OF THE DISCLOSURE

A trailer landing assembly with retractable legs. The assembly also is movable longitudinally of the trailer between a forward and a rearward position. The assembly includes an interlock mechanism so that the legs can be retracted or extended only when the assembly is in the forward position.

BACKGROUND OF THE INVENTION

The field of art to which the invention relates includes wheeled land vehicles with retractable ground supports.

When certain types of tractors are used to pull trailers, it is necessary to be able to move the trailer landing gear assembly longitudinally rearwardly on the trailer so as to provide clearance between the tractor and landing gear assembly when the tractor and trailer are turned relative to each other. However, having the landing gear assembly movable longitudinally rearwardly on the trailer presents a safety problem because if the trailer is being supported by a landing gear assembly located in the rearward position and a lift truck is driven into the front interior of the trailer, for example, it is possible to tip the trailer over forwardly. As a result, substantial damage can be done to the trailer, lift truck and contents of the trailer as well as possibly injuring the lift truck operator. Therefore, a principal object of my invention is to provide a landing gear assembly in which the legs are retractable or extendible only in the forward position of the assembly.

SUMMARY OF THE INVENTION

In carrying out my invention in a preferred embodiment I provide, in conjunction with a landing gear assembly having a pair of retractable legs, mechanism including a first shaft for retracting and extending the legs and mechanism including a second shaft for moving the assembly longitudinally relative to an associated trailer. A first lug is fixed to the first shaft and a second lug is fixed to the second shaft, and a bar is disposed between the lugs and movable between a first position in which substantial rotation of the first shaft only will be prevented by the first lug contacting the bar and a second position in which substantial rotation of the second shaft only will be prevented by the second lug contacting the bar.

The above and other objects, features and advantages of my invention will be more readily understood by persons skilled in the art when the detailed description is taken together with the drawing.

BRIEF DESCRIPTION OF THE DRAWING

FIG. 1 shows a trailer embodying my invention,
FIG. 2 is a fragmentary plan view showing a portion of my invention,
FIG. 3 is an enlarged fragmentary view of a portion of the landing gear assembly as shown in FIG. 2,
FIG. 4 is a side elevation of the portion of the landing gear assembly shown in FIG. 3,
FIG. 5 is similar to FIG. 3 with the landing gear shifted to the rearward position.

DESCRIPTION OF THE PREFERRED EMBODIMENT

Figure 6:
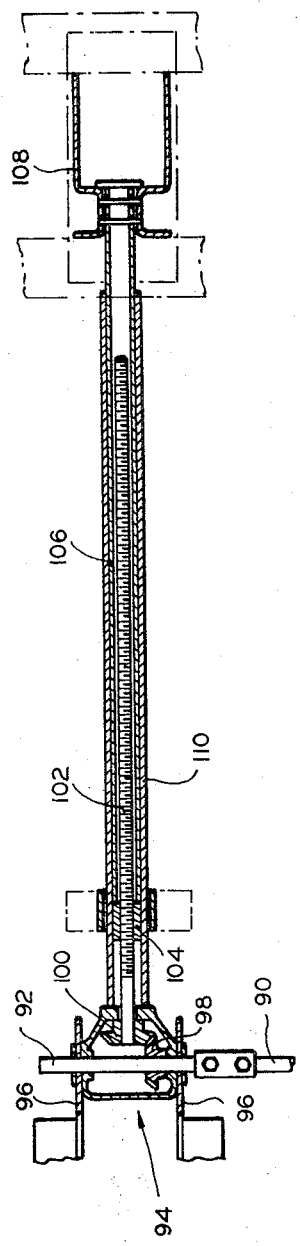
FIG. 6 shows a portion of the mechanism for moving the landing gear longitudinally relative to the trailer.

Referring now to FIG. 1, the reference numeral 10 denotes generally a trailer which includes a body 12 mounted on a frame 14 that is supported adjacent the rear thereof by ground engaging wheels 16. Trailer 10 is adapted to be connected to a tractor, not shown, adjacent the front end thereof by means of a king pin 18. When trailer 10 is not connected to a tractor, it is supported by means of a landing gear assembly 20 which is movable between a forward position shown and a rearward position at 20'.

Figure 7:
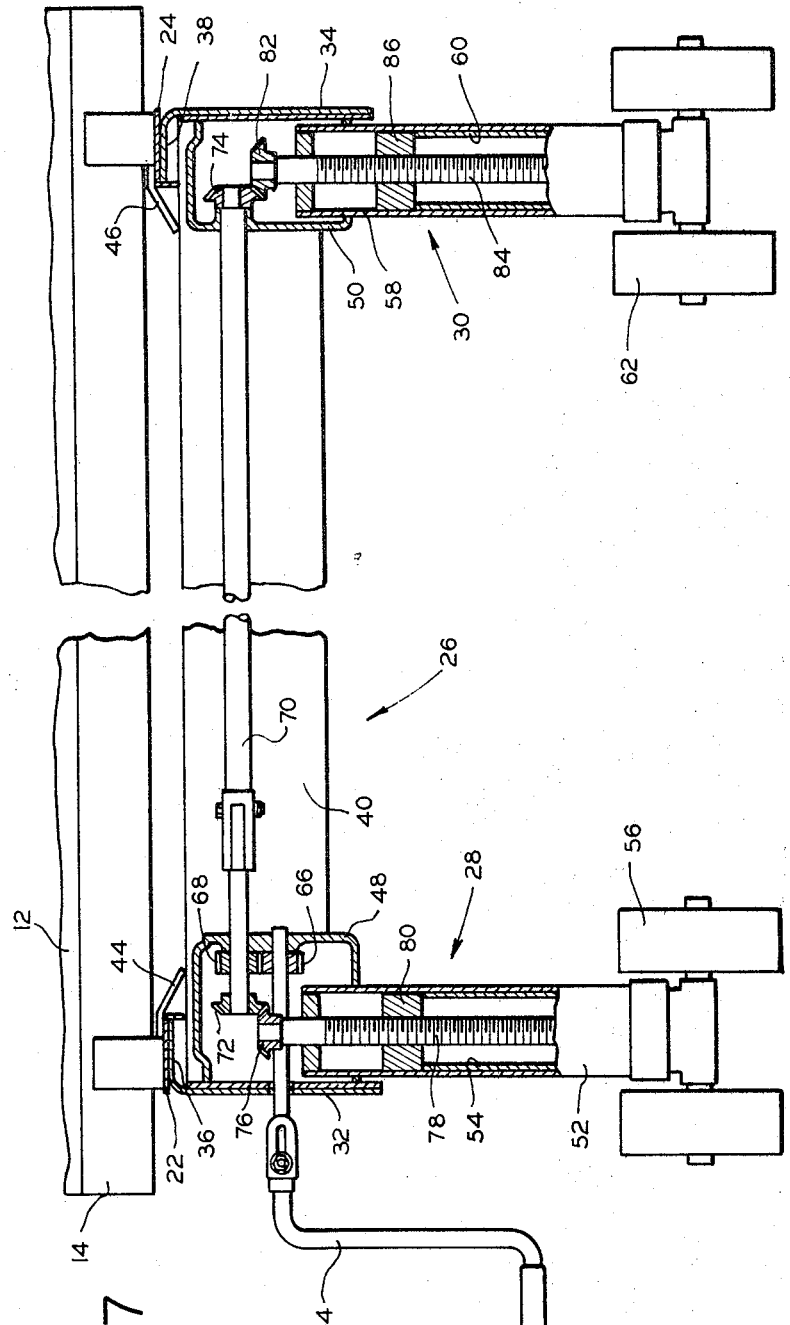
FIG. 7 shows the mechanism for extending and retracting the landing gear legs.

Referring now also to FIGS. 2 through 7, inclusive, it will be seen that a pair of parallel longitudinally extending rails 22 and 24 are connected to the underside of frame 14 and provide a track along which landing gear assembly 20 is movable longitudinally relative to trailer 10.

Landing gear assembly 20 includes a base 26 to which a pair of retractable legs 28 and 30 are connected. Base 26 includes a pair of end plates 32 and 34 that have inwardly extending flanges 36 and 38 which abut rails 22 and 24, respectively. End plates 32 and 34 are connected by a pair of cross braces 40 and 42, as shown. Base 26 is slidably connected to rails 22 and 24 by means of two pairs of brackets 44 and 46 which are connected to braces 40 and 42 and overlap rails 22 and 24, respectively.

Connected to end plates 32 and 34 are a pair of gear casings 48 and 50, respectively, to which retractable legs 28 and 30 are connected, as shown. Leg 28 includes an outer cylinder 52 which is fixed to gear casing 48 and an inner cylinder 54 which is slidably telescoped in cylinder 52. Attached to cylinder 54 at the bottom end thereof is a pair of wheels 56. Similarly, leg 30 includes an outer cylinder 58 connected to casing 50 and an inner cylinder 60 slidably telescoped in outer cylinder 58 and to which a pair of wheels 62 are attached at the bottom end hereof.

The mechanism for extending and retracting legs 28 and 30 includes a crank 64 which is rotatably journaled in casing 48, as shown, and to which a gear 66 is fixed. Gear 66 meshes with a similar gear 68 which is fixed to a cross shaft 70 that extends between and is rotatably journaled in casings 48 and 50. Connected to cross shaft 70 at each end thereof are bevel gears 72 and 74. Bevel gear 72 meshes with another bevel gear 76 which is fixed to a screw 78 that is journaled in the upper end of cylinder 52 and threadably engages a nut 80 that is fixed to the upper end of cylinder 54. Similarly, bevel gear 74 meshes with another bevel gear 82 which is fixed to a screw 84 that is rotatably journaled in the upper end of outer cylinder 58 and threadably engages a nut 86 which is fixed to the upper end of inner cylinder 60. At this point it will be obvious that rotation of crank 64 causes rotation of screws 78 and 84 through the gear train and cross shaft mechanism so that nuts 80 and 86 are caused to move upwardly or downwardly with the result that legs 28 and 30 will either be extended or retracted, depending upon the direction of rotation of crank 64, as is conventional in this art.

The mechanism for sliding landing gear assembly 20 longitudinally forwardly and rearwardly of trailer 10 along rails 22 and 24 includes a crank 88 which is connected to a shaft 90 that is rotatably journaled adjacent one end in end plate 32 and at the other end is connected to a shaft 92 of a right angle gear box 94 which is connected to base 26 by means of a pair of brackets 96. Gear box 94 includes a bevel gear 98 which is fixed to shaft 92 and another bevel gear 100 which meshes with bevel gear 98 and to which a screw 102 is connected. Screw 102 threadably engages a nut 104 which is connected at one end of a cylinder 106 which is anchored at the other end thereof to frame 14 of trailer 10 by means of a pair of brackets 108. Cylinder 106 is slidably telescoped in another cylinder 110 which is fixed to gear box 94 and serves simply to keep dirt and other foreign matter out of the mechanism. It will be clear now that rotation of crank 88 will result in rotation of screw 102, and thus cause landing gear assembly 20 to move either forwardly or rearwardly longitudinally of trailer 10, depending upon direction of rotation of screw 102 because nut 104 is held in place.

There is provided mechanism for interlocking rotation of shafts 70 and 90 which includes a lug 112 fixed to shaft 70 and a lug 114 fixed to shaft 90, the two lugs being displaced slightly laterally from each other, as best seen in FIGS. 3 and 5. Disposed between and parallel with shafts 70 and 90 is a rod 116 which extends through end plate 32 and terminates in a generally U-shaped handle 118. The end of rod 116 opposite handle 118 slidably extends through the legs of a U-shaped bracket 120 which is connected to cross brace 42 in the vicinity of lugs 112 and 114. Connected to rod 116, as shown, is a bar 122 which is biased to the position shown in FIG. 3 by means of a helical spring 124 which is disposed between bar 122 and one leg of bracket 120. When bar 122 is in the position shown in FIG. 3 one end thereof is in interfering relation relative to lug 114 so that rotation of shaft 90 is limited to less than one full revolution. Connected to handle 118 is a lug 126 which, when landing gear assembly 20 is disposed in the forward position thereof, as shown in FIGS. 1 and 3, engages a notch 128 in rail 22 so that spring 124 can move bar 122 to the position shown in FIG. 3. Obviously, with bar 122 in the position shown in FIG. 3 shaft 70 is free to rotate while, as pointed out before, shaft 90 is limited to less than one full revolution. Thus, legs 28 and 30 of landing gear assembly 20 can be extended or retracted. By pulling outwardly on handle 118 bar 122 is moved against bias of spring 124 to the position shown in FIG. 5 so that one end of bar 122 is now in interfering relation with lug 122 and the other end of bar 122 is moved out of interfering relation with lug 114. As a result it is no longer possible to extend or retract legs 28 and 30 significantly, but it is now possible to move landing gear assembly longitudinally of trailer 10 to the extreme rearward position. It will be noted that once landing gear assembly 20 has been moved slightly longitudinally that lug 126 no longer registers with slot 128 so that it is impossible to return bar 122 to the position shown in FIG. 3 until landing gear assembly has been returned to the extreme forward position thereof so that lug 126 is again brought into register with slot 128.

In explaining the operation of my landing gear assembly it will be assumed that trailer 10 is connected to a tractor and that landing gear assembly 20 is in the extreme forward position with legs 28 and 30 fully extended. This is normally the situation when a trailer has just been picked up by a tractor. The operator will now desire to move landing gear assembly 20 out of the way preparatory to transporting trailer 10 through the use of the attached tractor. The opeartor will first actuate crank 64 to fully retract legs 28 and 30. The operator then will pull handle 118 outwardly to the position shown in FIG. 5 so that it will now be possible to actuate crank 88 to move landing gear assembly 20 to the extreme rear position. When it is decided to detach trailer 10 from the associated tractor, the operator will have to extend legs 28 and 30 so as to support the front end of trailer 10. It will be noted that with landing gear assembly 20 in the extreme rear position that it is not possible to actuate crank 64 significantly so as to extend legs 28 and 30 because bar 122, being in the position shown in FIG. 5, will block any substantial rotation of shaft 70. The operator can actuate only crank 88 so as to move landing gear assembly 20 to the extreme forward position at which point lug 126 will register with notch 128 in rail 22, thus permitting spring 124 to move bar 122 to the position shown in FIG. 3. When this occurs further substantial actuation of rotation of shaft 90 will be blocked while shaft 70 will now be free to rotate, thereby permitting the operator, through rotation of crank 64, to extend legs 28 and 30 and thereby support the front end of trailer 10 so that the associated tractor can be disconnected therefrom and removed.

Clearly my invention prevents unsafe operation of landing gear assembly 20 which might otherwise occur if legs 28 and 30 could be extended when landing gear assembly 20 is in the extreme rearward position thereof.

The above detailed description is intended to be illustrative only since my invention is subject to various modifications and changes which would not depart from the scope and spirit of it, and so the limits of my invention should be determined from the following appended claims.

What is claimed is:

1. For use with a trailer having a landing gear assembly, the landing gear assembly including a pair of retractable ground engaging legs connected to the trailer for longitudinal movement between a forward position and a rearward position, means for actuating the pair of legs to retract or extend and means connected to the trailer for moving the landing gear assembly between the forward and rearward positions, the improvement comprising means for interlocking the actuating means and the moving means so that only the actuating means or the moving means can be operated at any one time and means for preventing opertaion of the actuating means except when the pair of legs is in the forward position.

2. For use with a trailer having a pair of longitudinally extending rails connected to the underside thereof, a landing gear assembly comprising a pair of retractable ground engaging legs slidably connected to the rails for movement between a forward position and a rearward position, means for actuating the said pair of legs to retract or extend, means connected to the trailer for moving the said pair of legs between the said forward and rearward positions, means for interlocking the said actuating and moving means so that only one of the said means can be operated at any one time, and means for preventing operation of the said actuating means except when the said pair of legs is in the said forward position.

3. A landing gear assembly as set forth in claim 2 wherein the said actuating means includes a first rotatable shaft, the said moving means includes a second rotatable shaft, and the said interlocking means includes a first lug connected to the said first shaft, a second lug connected to the said second shaft and a bar movable between first and second positions, the said lugs and bar cooperating so that when the said bar is in the said first position it engages only the said first lug and prevents any substantial rotation of the said first shaft and when the said bar is in the said second position it engages only the said second lug and prevents any substantial rotation of the said second shaft.

4. A landing gear assembly as set forth in claim 3 wherein the said interlocking means includes a rod connected to the said bar and the said preventing means includes a third lug connected to the rod and a notch in one of the pair of rails, the said notch and third lug being disposed so that the said third lug can engage the said notch only when the said leg is located at the said forward position, the said bar, notch and three lugs co-operating so that the said bar is in the said second position when the said third lug engages the said notch and the said bar is in the said first position when the said third lug does not engage the said notch.

References Cited

UNITED STATES PATENTS 3,253,839  5/1966  Warren _____ 280—150.5

LEO FRIAGLIA, Primary Examiner

R. R. SONG, Assistant Examiner